United States Patent [19]
Nakamura et al.

[11] Patent Number: 5,456,131
[45] Date of Patent: Oct. 10, 1995

[54] VEHICLE TRANSMISSION OPERATION APPARATUS

[75] Inventors: Tatsuo Nakamura, Okazaki; Kazushige Kitano, Nagoya; Yutaka Oguri, Okazaki, all of Japan

[73] Assignee: Mitsubishi Jidosha Kogyo Kabushiki Kaisha, Tokyo, Japan

[21] Appl. No.: 152,712

[22] Filed: Nov. 16, 1993

[30] Foreign Application Priority Data

Nov. 27, 1992 [JP] Japan ................. 4-081986 U

[51] Int. Cl.⁶ ..................................... F16H 61/06
[52] U.S. Cl. ......................................... 74/476
[58] Field of Search ...................... 74/476, 473 R

[56] References Cited

U.S. PATENT DOCUMENTS

| | | | |
|---|---|---|---|
| 4,337,673 | 7/1982 | Kawamoto | 74/476 |
| 4,359,910 | 11/1982 | Namazawa et al. | 74/476 |
| 4,483,213 | 11/1984 | Takahashi | 74/476 |
| 5,331,863 | 7/1994 | Kobayashi et al. | 74/476 |

FOREIGN PATENT DOCUMENTS

| | | | |
|---|---|---|---|
| 0435832 | 7/1991 | European Pat. Off. | |
| 4110012 | 5/1992 | Germany | |
| 4118930 | 12/1992 | Germany | |
| 50-78752 | 6/1975 | Japan | |
| 55-85929 | 6/1980 | Japan | |
| 55-85930 | 6/1980 | Japan | |
| 55-85931 | 6/1980 | Japan | |
| 0107159 | 8/1980 | Japan | 74/476 |
| 57-161028 | 10/1982 | Japan | |
| 2161555 | 1/1986 | United Kingdom | 74/476 |

*Primary Examiner*—Richard M. Camby
*Assistant Examiner*—Christopher Ellis

[57] ABSTRACT

In an operation apparatus for a vehicle transmission in which a shift lever and a control shaft of the transmission are operably connected by a shift cable and a select cable, a shift finger is mounted on the control shaft, and shift rags engaging with the shift finger are mounted on the forward and reverse shift rails, a block plate is mounted to the control shaft. A detent pin, which is pressed and moved by the block plate when moving the control shaft for selecting the reverse shift rail, is provided. Further, the detent pin is provided with a shock absorber so that the resistance is increased at rapid operation of the block plate and decreased at slow operation of the block plate.

10 Claims, 4 Drawing Sheets

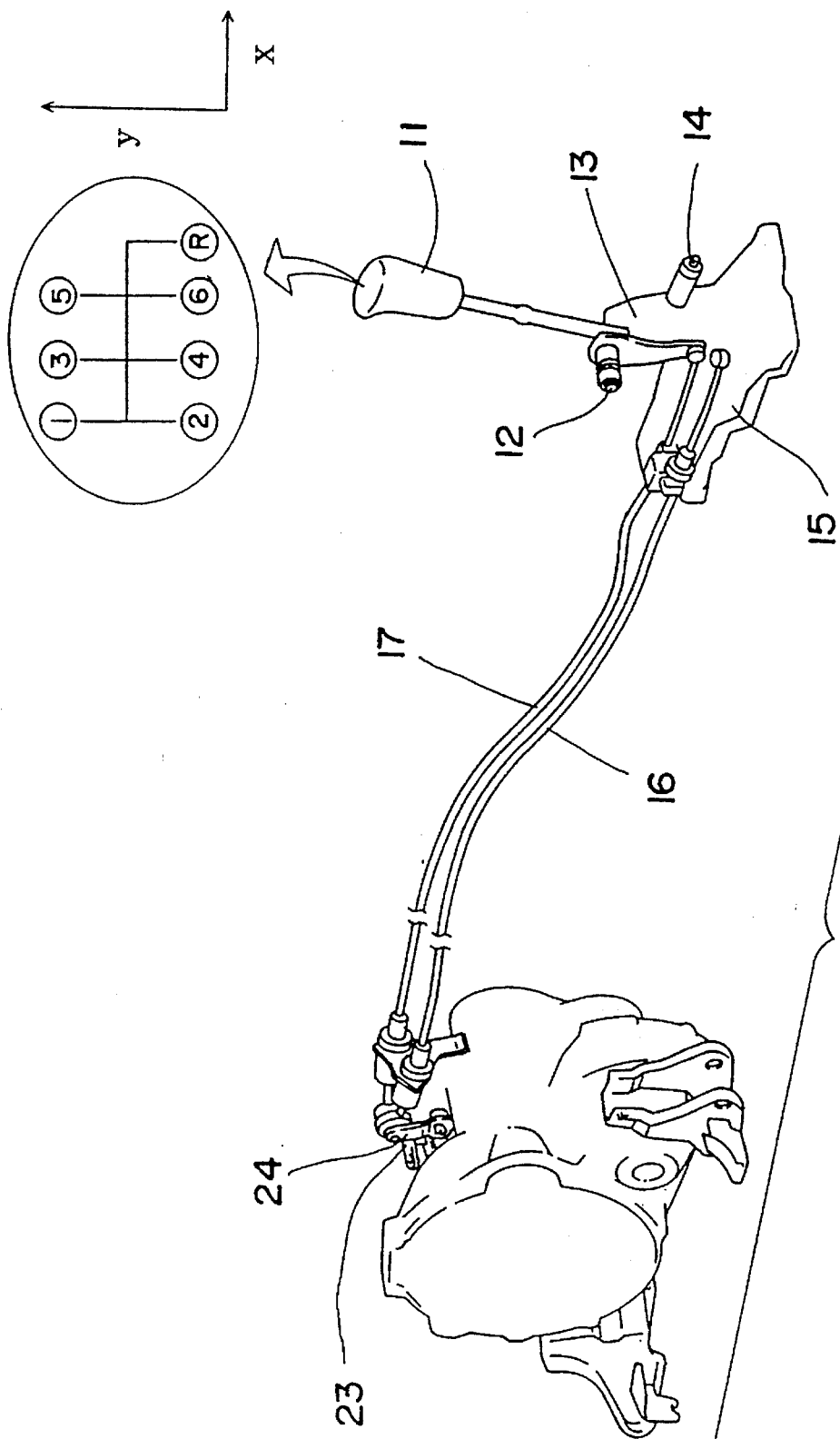

VEHICLE TRANSMISSION OPERATION APPARATUS

BACKGROUND OF THE INVENTION

This invention relates to an apparatus for operating a power transmission of a vehicle for use in a gear shift control apparatus of a manual transmission, to prevent misoperation.

A vehicle is provided with a power transmission for achieving smooth running under a complicated traveling condition. In general, this transmission controls the driving force and speed of the vehicle by changing engagement of a plurality of gears differing in the number of teeth or pitch. The transmission is to change the gear according to the traveling condition of the vehicle, and this type of transmission includes a manual transmission in which the driver manipulates a shift lever manually, and an automatic transmission in which a control apparatus automatically operates the transmission according to the traveling condition.

In the manual transmission, speed change is achieved by manipulating the shift lever provided in the vicinity of the driver's seat, and the shift lever includes a number of shift range patterns. In general, in a shift lever disposed on the floor of the vehicle, the shift lever is movable in the select direction which is right or left to the traveling direction of the vehicle, and also movable at each select position in the shift direction to the front and rear relative to the traveling direction of the vehicle.

On the other hand, in a transmission disposed adjacent to an engine, a control shaft which is movable in the axial direction and rotatable in the peripheral direction is provided on a housing. The housing is provided with a plurality of forward shift rails and reverse shift rails for linking the transmission gears, and a shift rag engaging with a shift finger is mounted to each shift rail. The shift lever and the control shaft are operably connected by a shift cable and a select cable.

To make a shift change of the transmission, when the driver operates the shift lever in the select direction to move the select cable, the control shaft of the transmission moves in the axial direction, and the shift finger engages with the shift rag of the selected position. When the shift lever is operated in the shift direction to move the shift cable, the control shaft of the transmission rotates to shift the shift rail through the shift rag engaging with the shift finger to link the gear to complete the shift change operation.

In such a manual transmission which has a plurality of forward shift ranges (1–5 speeds) and a reverse shift range (R: reverse), it is very dangerous to make a shift change to the reverse shift range in which the gear rotation is the reverse during operation of the shift lever in forward traveling of the vehicle. This may damage the gears. Therefore, the known manual transmission is provided with a misoperation prevention device.

The known misoperation prevention device can be operated with no resistance when making a shift change from the neutral position of the shift lever to a forward shift range (1–5 speed), but there is a moderate resistance when operating to the reverse shift range (R), making it difficult to make a shift change. Specifically, a block plate is mounted on the control shaft, and the housing is provided with an urged detent pin, so that when the shift lever is operated to the reverse range, the block plate contacts against the detent pin to produce a resistance. Therefore, when the shift lever is attempted to be shifted to the reverse range in the forward shift ranges (1–5 speeds), a resistance for the block plate to push in the detent pin is produced, thereby preventing misoperation of the shift lever during shift change operation.

In the misoperation prevention device in the above manual transmission, the detent pin to produce a resistance to the shift lever during shift change operation is urged by a coil spring. Since a quick shift change operation is required during running of the vehicle, operation of the shift lever is relatively rapid while the vehicle is running. Therefore, when the shift lever is attempted to be shifted to the reverse position by mistake during shifting in the forward 1st to 5th speeds, there has been a problem in that if the operation speed of the shift lever is high, the operation force is high, and the urging force of the coil spring does not make a resistance, resulting in a misoperation.

Then, to prevent such misoperation even when the operation speed of the shift lever is high, it is considered to set the urging force of the coil spring to a high value. However, this method involves a problem in that when the shift lever operation speed is low, that is, when the operation force is small, shift change to the reverse position is impeded to impair the shift change operability to the reverse position during ordinary operation.

With a view to solve the above mentioned problems, a primary object of the present invention is to provide an operation apparatus for a vehicle transmission which can positively prevent misoperation without impairing the shift change operability.

SUMMARY OF THE INVENTION

The objects of the present invention are fulfilled by providing an operation apparatus for a vehicle transmission having an operation lever capable of shift selecting disposed in the room of the vehicle, a control shaft supported on the transmission being operated by a shift and select operation of the operation lever, and a shift range setting mechanism for achieving forward and reverse shift ranges according to operation of the control shaft. Further, a block plate is mounted on the control shaft. A detent pin, mounted on a housing of the transmission, is pressed by the block plate when shifting to the reverse range. Finally, a resistance member is included for regulating movement of the detent pin and for increasing the resistance at rapid operation of the block plate and decreasing the resistance at slow operation of the block plate.

Since the detent pin pressed and moved by the block plate is provided with a resistance member which increases the resistance at rapid operation of the block plate and decreases the resistance at slow operation of the block plate, when the shift lever is attempted to be shifted to the reverse position by mistake during the time the shift lever is shift-changing in forward shift ranges, the resistance of the detent pin is high, thereby positively preventing misoperation. On the other hand, when the shift lever is attempted to be shifted slowly from a forward shift range to the reverse shift range, the resistance of the detent pin is small, and the shift operation is easily achieved.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

FIG. 3 is a schematic view showing a control apparatus for the transmission.

DETAILED DESCRIPTION OF THE PREFERRED EMBODIMENT

Figure 1:
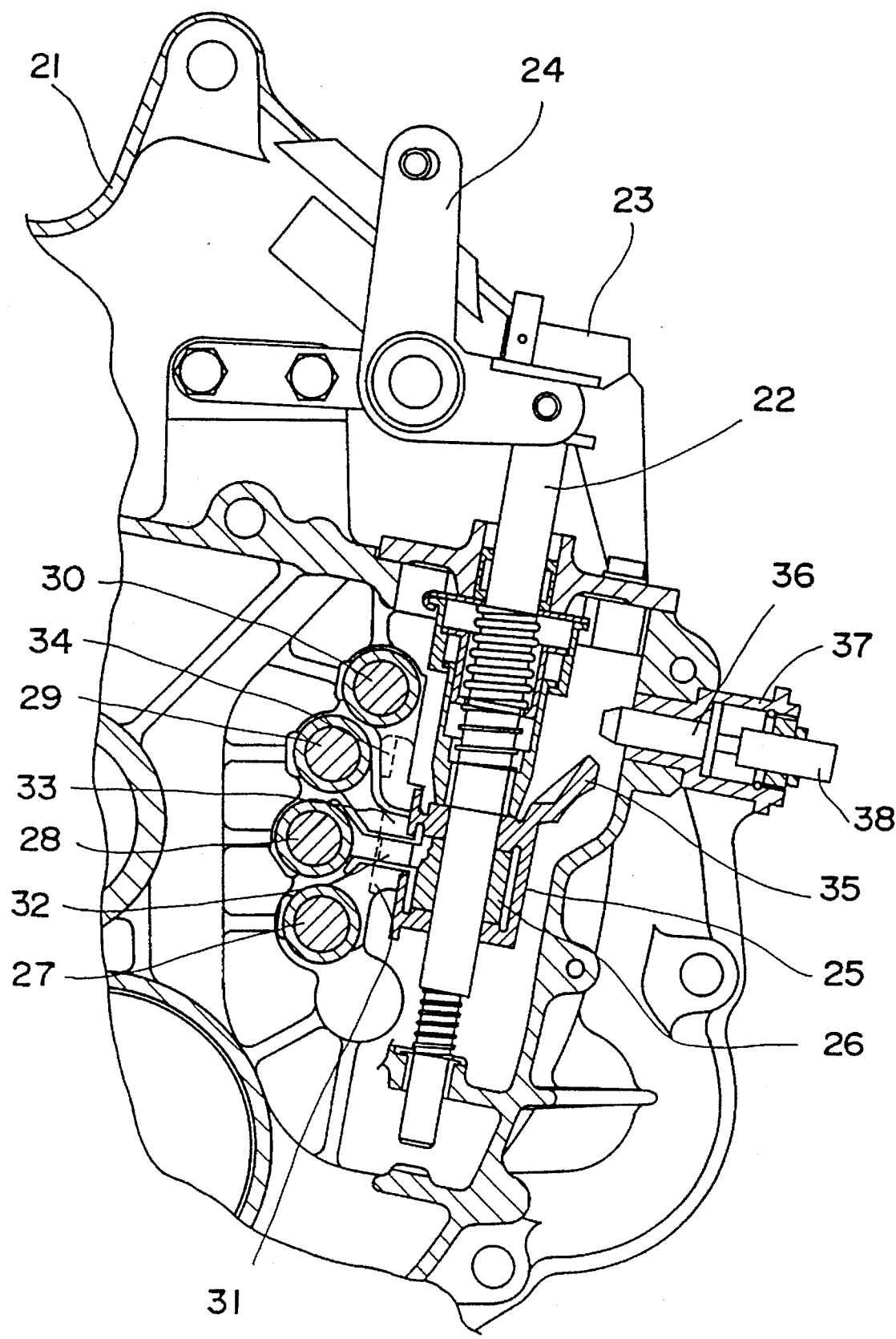
FIG. 1 is a schematic sectional view of part of a transmission showing an embodiment of the operation apparatus for a vehicle transmission according to the present invention.

An embodiment of the present invention will now be described in detail with reference to the drawings.

As shown in FIG. 3, in the control apparatus for a manual transmission of the present embodiment, the foot of a shift lever 11 is rotatably supported on a bracket 13 by a first supporting shaft 12, the bracket 13 is rotatably supported on a base plate 15 by a second supporting shaft 14. Thus, the shift lever 11 is swingable in a select direction X which is a right and left direction relative to the traveling direction of the vehicle and in a shift direction Y which is a front and rear direction relative to the traveling direction of the vehicle. Ends of a select cable 16 and a shift cable 17 are connected to a lower portion of the shift lever 11 so that the select cable can be moved in the longitudinal direction by swinging the shift lever 11 in the select direction X, and the shift cable 17 can be moved in the longitudinal direction by swinging the shift lever 11 in the shift direction Y. The shift range pattern of the shift lever 11 of the present embodiment has 1 to 6 forward speed ranges (although this not to be considered limitative in any way) and a reverse speed range (R).

In addition, as shown in FIG. 1, a transmission housing 21 is provided with a control shaft 22 to be movable in the axial direction and rotatable in the peripheral direction. A select cam lever 24 and a shift cam lever 29 are connected to the top end of the control shaft 22. The select cam lever 24 is connected with the other end of the select cable 16, and the shift cam lever 29 is connected with the other end of the shift cable 17.

A hollow supporting pipe 25 is for preventing double engagement at a lower portion of the control shaft 22. A shift finger 26 is mounted on the inside of the supporting pipe 25. On the other hand, the housing 21 is provided with shift rails 27, 28, and 29 for 1–2 speed, 3–4 speed, and 5–6 speed, and a reverse shift rail 30 to be movable in the axial direction. The individual shift rails 27, 28, 29, and 30 are individually formed integrally with forked shift rags 31, 32, 33, and 34 which are engaged with engagement portions projecting out of the shift finger 26.

The supporting pipe 25 mounted on the control shaft 22 is integral with a block plate 95 which is projecting upward. On the other hand, the housing 21 is provided with a detent pin 36 to be pressed and moved by the block plate 95 when moving the control shaft 22 for selecting the reverse shift rail 30 by a cylindrical supporting body 37 to be movable in the axial direction. The supporting body 37 is provided with a shock absorber 38 as a resistance member positioned at the rear of the detent pin 36, which produces a high resistance at rapid movement of the block plate 35 and a small resistance at slow movement of the block plate 35.

Figure 2A:
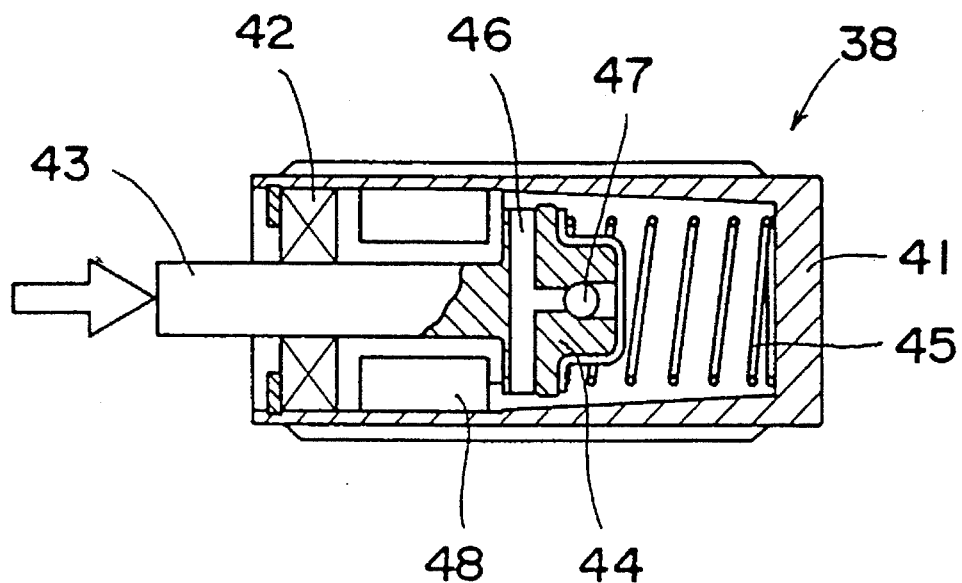
FIGS. 2(a) and 2(b) are schematic sectional views of a shock absorber.

The shock absorber 38, as shown in FIG. 2(a), is movably provided with a piston rod 43 in a cylindrical housing 41 through a bearing 42 (the piston rod not yet pressed in the direction of the arrow in FIG. 2(a)). A coil spring 45 is disposed between a piston 44 integrally formed with the piston rod and the housing 41, and injected with silicone oil. The inner periphery of the housing 41 is tapered to be narrower towards the rear side, that is, the right side in FIG. 2, so that an annular orifice is formed between the outer periphery of the piston 44 and the inner periphery of the housing 41. In the Figure, the numeral 46 indicates an oil passage, the numeral 47 indicates a check ball, and the numeral 48 indicates an accumulator.

Figure 2B:
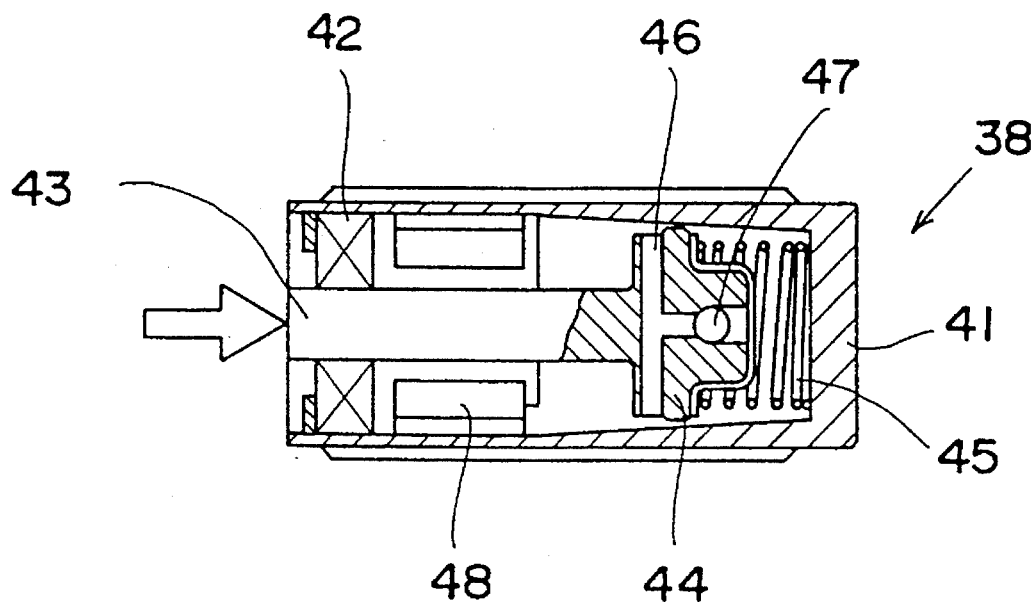

Therefore, as shown in FIG. 2(b), when the piston rod 43 is pressed in the direction of the arrow, the piston 44 moves right and left in the housing 41. At this moment, silicone oil filled in between the piston 44 and the housing 41 moves from the annular orifice formed between the outer periphery of the piston 44 and the inner periphery of the housing 41. When the piston 44 moves further in the housing 41, as shown in FIG. 2(b), the clearance of the annular orifice is gradually decreased, and the moving speed of the piston 44 is decreased.

As shown in FIGS. 1 to 3, in a shift change of the transmission, when the driver operates the shift lever 11 in the select direction X to move the select cable 16, the control shaft 22 of the transmission moves in the axial direction, and the shift finger 26 engages with one selected from the shift rags 31, 32, 33, and 34 of the 1–2 speed, 3–4 speed, 5–6 speed shift rails 27, 28, and 29, and the reverse shift rail 30. When the shift lever 11 is operated in the shift direction Y to move the shift cable 17, the control shaft 22 rotates to shift, for example, and the shift rail 28 through the shift rag engaged with the shift finger 26 in FIG. 1 to link the speed gear of the selected speed, thereby achieving a shift change.

When the driver makes a shift change from the neutral position to the 5th or 6th speed, the shift lever 11 is operated in the select direction X to move the select cable 16, and the control shaft 22 of the transmission is moved upward in the axial direction from the condition shown in FIG. 1 so that the shift finger 26 engages with the shift rag 33 of the 5–6 speed shift rail 29. However, since a quick shift operation is required during running of the vehicle, the shift finger tends to pass over the 5–6 speed shift rag 33 to the reverse shift rag 34. At this moment, the block plate 35 mounted to the control shaft 22 contacts against the tip taper portion of the detent pin 36, and the movement of the control shaft 22, that is, the movement of the shift lever 11 is impeded by the shock absorber 38. This thereby prevents misoperation to the reverse position during a shift change to the 5th or 6th speed.

Figure 4:
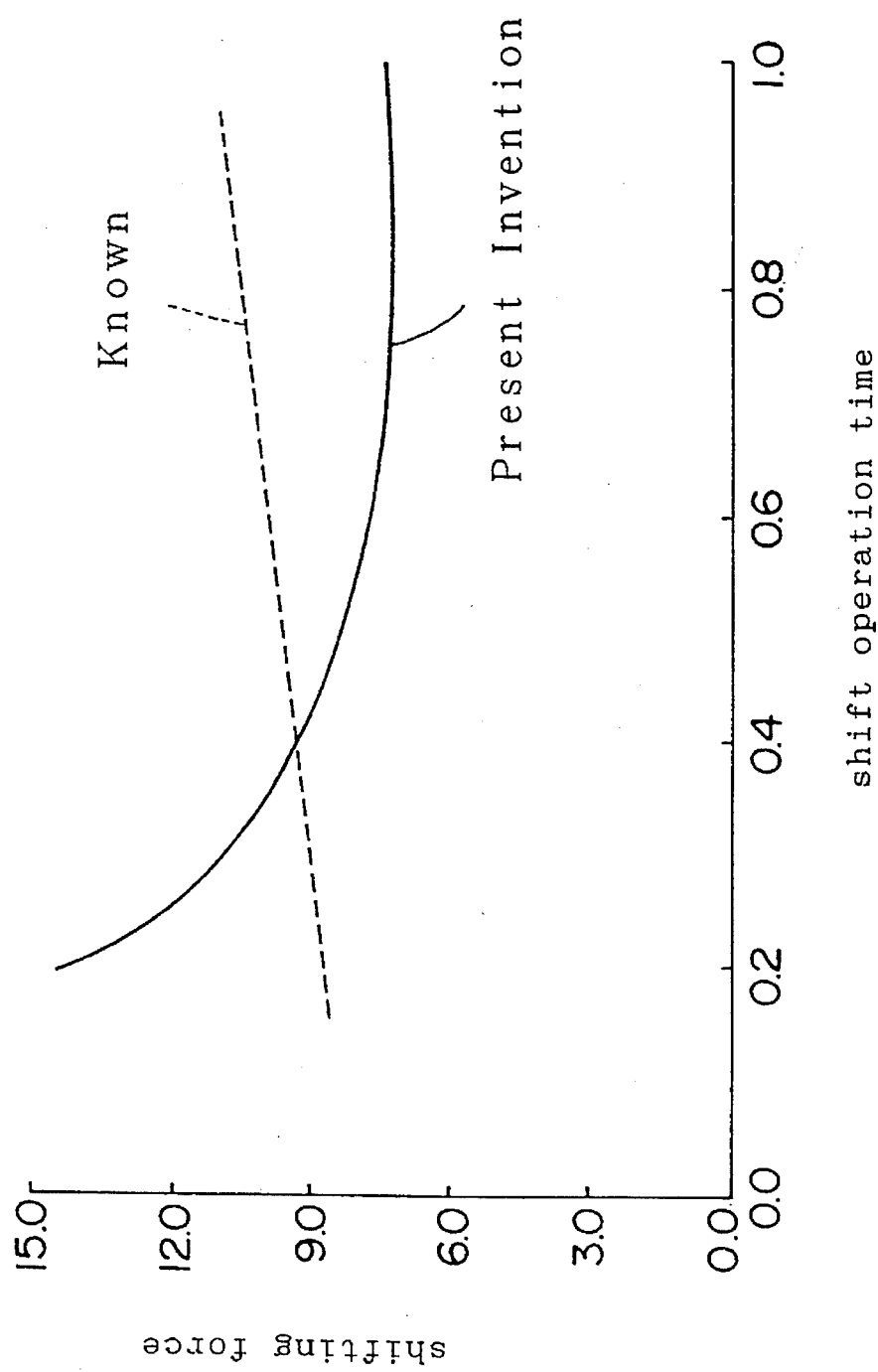
FIG. 4 is a graph showing a shift operation of time vs. a shifting force.

FIG. 4 is a graph showing the operation time of the shift lever from the neutral position to the entrance of the reverse position against the operation force of the shift lever (pressing force of the detent pin 36). As can be seen from the Figure, while in the known apparatus, the shift lever operation force is small when the shift lever operation time is short, in the present embodiment, the shift lever operation force is high when the shift lever operation is rapid, and the shift lever operation force decreases as the shift lever operation becomes slow. Therefore, at a quick shift operation during running of the vehicle, the shift lever 11 can be positively prevented from being shifted from the 5–6 speed shift range to the reverse shift range.

In a shift to the reverse shift range, the shift lever 11 is operated in the select direction X to move the control shaft 22 upward in the axial direction through the select cable 16, so that the shift finger 26 engages with the shift rag 34 of the shift rail 30. At this moment, since the vehicle is not running, the shift lever 11 is operated slowly, and the resistance of the detent pin 36 is small. Then, the shift lever 11 is operated in the shift direction Y to rotate the control shaft 22 through the shift cable 17, so that the shift rail 30 is shifted through the shift rag engaging with the shift finger 26 to link the reverse speed gear, thereby achieving the shift change.

In the above embodiment, the shift pattern includes forward 1–6 ranges and a reverse range (R), however, the present invention is not limited to this. The detent pin 36 is provided with the shock absorber 38 as a resistance member to provide a resistance, but a different damper mechanism may alternatively be used.

As described above in detail with reference to the embodiment, since, in the operation apparatus for a vehicle transmission according to the present invention, the control shaft of the transmission is provided with the block plate, the housing is provided with the detent pin to be pressed and moved by the block plate when the control shaft is moved to select the reverse shift rail, and the detent pin is provided with a resistance member for increasing the resistance at rapid operation of the block plate and decreasing the resistance at slow operation, if the shift lever is attempted to be shifted by mistake to the reverse position during a rapid shift change in the forward shift ranges, the resistance of the detent pin is increased against the high operation force of the shift lever to prevent the shift change to the reverse position. On the other hand, in normal shift operation to the reverse range, the resistance of the detent pin is decreased against the small operation force of the shift lever to enable easy shift operation. Thus, misoperation can be positively prevented without impairing the shift change operability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An operation apparatus for a vehicle transmission having an operation lever capable of shift selecting, a control shaft supported on the transmission and being operated in response to a shift selection of said operation lever, and a shift range setting mechanism for setting forward and reverse shift ranges according to operation of said control shaft, the operation apparatus comprising:

a block plate mounted on said control shaft;

a detent pin mounted on a housing of the transmission, the detent pin being pressed by said block plate when shifting to the reverse range; and a resistance control means for regulating movement of said detent pin and for increasing the resistance of movement of the detent pin in response to rapid operation of said block plate and for decreasing the resistance of movement of the detent pin in response to slow operation of said block plate.

2. The operation apparatus of claim 1 wherein said resistance member includes a damper, and wherein said operation apparatus is mounted on said housing of the transmission, and said housing is provided with a supporting body for supporting said detent pin and said damper.

3. The operation apparatus of claim 2 wherein said damper is a hydraulic damper which comprises a piston rod contacting against said detent pin and a case member for movably supporting said piston rod, wherein an inner periphery of said case member is tapered and decreases in diameter towards a direction of compression of said piston rod.

4. The operation apparatus of claim 3 wherein said piston rod is formed with a flange at a side end of said case member, and an orifice is formed between said flange and the tapered inner periphery of said case member.

5. An apparatus for preventing misoperation of a manual transmission, comprising:

a plate, connected to a control shaft of the manual transmission, movable at a speed proportional to an operation speed of the shift lever;

inhibition means for contacting the plate and for providing resistance to the movement of the plate upon contact; and resistance control means for increasing resistance of the inhibition means in response to relatively rapid movement of the plate and for decreasing resistance of the inhibition means in response to relatively slow movement of the plate.

6. The apparatus of claim 5, wherein the resistance control means includes a damper.

7. The apparatus of claim 5, wherein the resistance control means increases resistance to prevent an inadvertent manual shift from a forward driving gear to a reverse driving gear and decreases resistance to allow for a non-resistance shift from a neutral gear to a reverse driving gear.

8. The apparatus of claim 5, wherein the resistance of the inhibition means is increased for rapid shift operation and is proportionately decreased as shift operation becomes proportionately less rapid.

9. The apparatus of claim 5, wherein the resistance control means includes a piston contacting the inhibition means, a fluid filled chamber housing the piston, and a spring biasing movement of the piston to thereby relatively control resistance of the inhibition means in response to relative movement of the plate.

10. The apparatus of claim 9, wherein the inhibition means is a detent pin.

* * * * *